Figure 1:
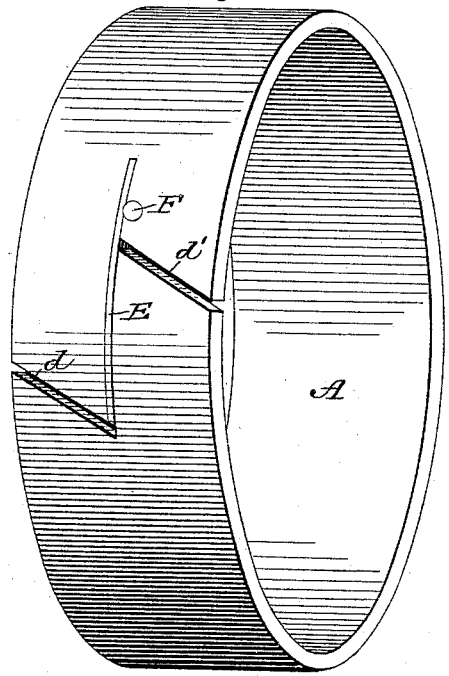

(No Model.)

J. BRANDON.
PISTON PACKING RING.

No. 426,634. Patented Apr. 29, 1890.

Attest:
A. N. Jesbra
E. W. Watson

Inventor:
James Brandon
By David A. Burr
Atty.

UNITED STATES PATENT OFFICE.

JAMES BRANDON, OF NEW YORK, N. Y.

PISTON PACKING-RING.

SPECIFICATION forming part of Letters Patent No. 426,634, dated April 29, 1890.

Application filed July 27, 1889. Serial No. 318,826. (No model.)

*To all whom it may concern:*

Be it known that I, JAMES BRANDON, of the city, county, and State of New York, have invented a new and useful Improvement in Piston Packing-Rings; and I do hereby declare that the following is a full and exact description thereof, reference being had to the accompanying drawings, and to the letters of reference marked thereon, making a part of this specification.

This invention relates to an improvement in the joint in the packing-ring for a piston, whereby the ring is permitted to expand, in order to make a close contact with the cylinder within which it plays without opening a throughway at the joint.

Heretofore in the most approved packing-ring the ring has been divided at one point by an oblique transverse cut, and the direct passage of the fluid under pressure from side to side of the piston through said cut has been prevented by means of a strip inserted in the ring transversely to the length of the cut, so as to intersect the joint, and an example thereof may be found illustrated in Letters Patent No. 315,155, issued to me April 7, 1885. As an improvement upon said joint the packing-ring has been constructed in two or more segmental sections having joint or lines of junction formed of two oblique lines or cuts extending severally inward from the two faces of the ring to about the middle of its width, where they are connected by a straight circumferential line or cut forming an offset at the inner ends of said oblique lines. The two surfaces on this circumferential line are scraped together to make a steam-tight joint, thereby avoiding the necessity of inserting a transverse piece in the joint dividing the sections. This form of joint in a sectional ring is illustrated in the Letters Patent No. 345,569, issued to me July 13, 1886. It necessitates, however, as set forth, the division of the ring into two or more sections, in order to permit the contacting surface on the circumferential line to be scraped or fitted together.

The object of my present invention is to secure the advantages of this oblique joint having a central offset, and which avoids the necessity of a loose piece inserted transversely to the length of the joint, in connection with a ring divided at one point only, so as to have but a single joint therein; and my invention consists in the combination, with a circumferential slot cut in the ring and having lateral inclined cuts extending in opposite directions from its ends to the outer edges of the ring to divide it, of a piece inserted in the slot to fill it and maintain the normal width of the ring, and which is secured to one of the inner faces of the slot, and is left free to move over the opposite face and break joint with one of the lateral cuts, substantially as hereinafter described and claimed.

Figure 2:
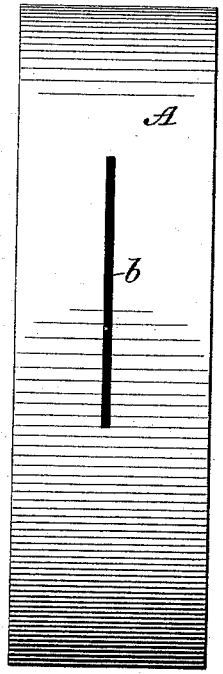
Figure 3:
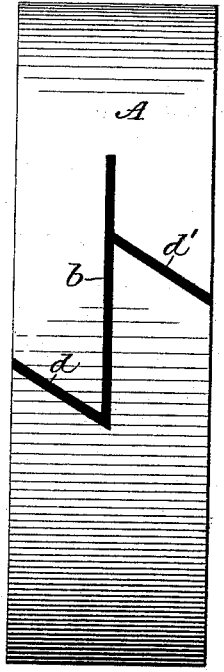
Figure 4:
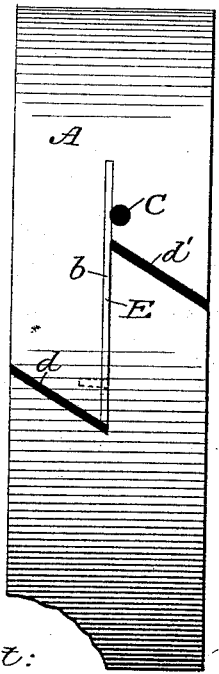

In the accompanying drawings, Figure 1 is a view in perspective of a packing-ring divided at one point only with my improved offset joint. Figs. 2, 3, and 4 are front elevations of said ring, illustrating successive steps in the formation of the joint, Fig. 5 being a perspective view of the joint when sprung apart laterally far enough to permit riveting the facing-strip by which the joint is made steam-tight.

A represents the metallic packing-ring, which is made at the outset to form an unbroken circle. In forming a joint in said ring to allow it to expand or contract radially with an elastic tension I first cut a central slot or slit in the periphery of the ring parallel with its sides, as shown at $b$ in Fig. 2. This may be quickly done by means of a circular saw. Two oblique cuts $d$ and $d'$ are then made in the ring parallel with each other, to divide it transversely, the one $d$ to extend outwardly on one side from a point at one end of the slit $b$ and the other $d'$ on the opposite side outwardly from a point about two-thirds the length of the slit. To produce a steam-tight joint along the circumferential slit $b$ without reducing the width of the ring or impairing the exact parallelism of its opposite faces, and without affecting its freedom of contraction or expansion by reason of its division, I insert within the slit $b$ a metallic strip E, (see Figs. 1, 4, and 5,) which shall closely fit in said slit and extend from end to end thereof in close contact with its two sides to form a close joint therewith.

Figure 5:
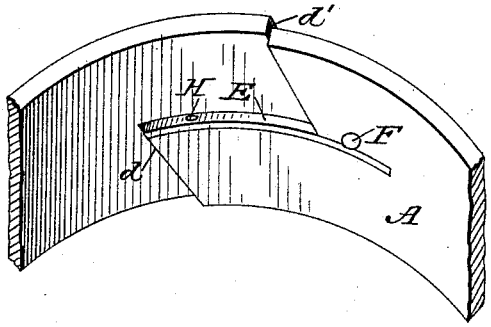

The strip E may be made fast in any suitable manner; but, by preference, a hole C is drilled in the edge of the portion of the slit $b$, which extends beyond the second oblique cut $d'$, in manner to partially intersect and cut the strip inserted in the slit, as shown in Fig. 4, and is tapped to receive a screw F, (see Figs. 1 and 5,) which, being inserted therein, serves to firmly lock and fasten that end of the strip. The ring A is then sprung apart laterally at its joint, as shown in Fig. 5, far enough to permit of the drilling of a rivet-hole through the exposed face of the strip E and into the body of the ring, and the insertion of a rivet H, which completes the fastening of the strip, so as to make it virtually an integral portion of the ring, supplying thereto the metal removed in cutting out the slit b. The free face of this strip E, when fitted and secured in place as described, will form a steam-tight joint with the opposite face of the offset in the cut dividing the ring when the normal width of the ring is maintained, while the two faces of the joint will have liberty to move one upon the other, leaving the ring free to expand or contract, as required.

I claim as my invention—

1. A divided packing-ring made in one piece with a single irregular joint, a portion of which is circumferential in direction, in combination with a metallic strip inserted in the circumferential length of the joint and secured to one edge thereof to move freely over the opposite edge, whereby the joint is guarded to prevent a leak of steam through it without diminishing the normal width of the ring, substantially in the manner and for the purpose herein set forth.

2. An elastic divided packing-ring formed in a single piece, of uniform width throughout, having a circumferential slot cut centrally in the width thereof, of a length greater than the distance thereto from either edge of the ring, and connected with the two edges by two parallel lateral cuts inclined to the axis of the ring and severally extending outwardly from points at or near each end of said slot, in combination with an inserted piece filling the width of said slot and secured to one edge thereof to move freely over the opposite edge and break joint with one of the lateral cuts, substantially in the manner and for the purpose herein set forth.

In testimony whereof I have signed my name to this specification in the presence of two subscribing witnesses.

JAMES BRANDON.

Witnesses:
  A. N. JESBERA,
  E. M. WATSON.